United States Patent
Maekawa

(10) Patent No.: US 9,902,278 B2
(45) Date of Patent: Feb. 27, 2018

(54) POWER SUPPLYING DEVICE, WIRELESS POWER-SUPPLYING SYSTEM, AND BAG UNIT

(71) Applicant: IHI Corporation, Tokyo (JP)

(72) Inventor: Yuji Maekawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 232 days.

(21) Appl. No.: 14/828,774

(22) Filed: Aug. 18, 2015

(65) Prior Publication Data

US 2015/0352964 A1    Dec. 10, 2015

Related U.S. Application Data

(63) Continuation of application No. PCT/JP2014/062598, filed on May 12, 2014.

(30) Foreign Application Priority Data

May 15, 2013    (JP) .................................. 2013-103288

(51) Int. Cl.
    *B60L 1/00*      (2006.01)
    *B60L 11/18*     (2006.01)
    *H02J 50/10*     (2016.01)

(52) U.S. Cl.
    CPC ......... *B60L 11/182* (2013.01); *B60L 11/1805* (2013.01); *B60L 11/1824* (2013.01); *B60L 11/1833* (2013.01); *B60L 11/1835* (2013.01); *B60L 11/1848* (2013.01); *H02J 50/10* (2016.02); *B60L 2210/30* (2013.01); *B60L 2210/40* (2013.01); *Y02T 10/7005* (2013.01); *Y02T 10/7072* (2013.01);
(Continued)

(58) Field of Classification Search
    CPC ......... G08G 1/142; H07B 15/02; G06Q 19/02
    See application file for complete search history.

(56) References Cited

U.S. PATENT DOCUMENTS

| | | | | |
|---|---|---|---|---|
| 6,241,418 B1 * | 6/2001 | Suzuki | ................. | E01F 13/085 404/6 |
| 2008/0247746 A1 * | 10/2008 | Law | .................... | G03B 17/566 396/419 |
| 2013/0033227 A1 * | 2/2013 | Gibbons, Jr. | ....... | B60L 11/1829 320/108 |

FOREIGN PATENT DOCUMENTS

| | | |
|---|---|---|
| JP | 11-107571 A | 4/1999 |
| JP | 2012-196015 A | 10/2012 |

(Continued)

OTHER PUBLICATIONS

International Search Report, PCT/JP2014/062598, dated Aug. 12, 2014, 1 pg.

*Primary Examiner* — Sibin Chen
(74) *Attorney, Agent, or Firm* — Volpe and Koenig, P.C.

(57) ABSTRACT

A wireless power-supplying system includes a power-supplying coil installed within a predefined parking space, a balloon provided to cover the power-supplying coil and configured to expand to occupy a space between the power-supplying coil and a power-receiving coil of the vehicle parked in the parking space, and fix the vehicle from below, and a power supply control unit configured to cause the balloon to fix the vehicle until payment of a usage fee of the parking space is completed when the vehicle has been fixed from below by the balloon, wherein power is wirelessly supplied from the power-supplying coil to the power-receiving coil of the vehicle in a state in which the vehicle is fixed to the balloon.

9 Claims, 6 Drawing Sheets

(52) U.S. Cl.
CPC ............ *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

FOREIGN PATENT DOCUMENTS

| | | |
|---|---|---|
| JP | 2013-002085 A | 1/2013 |
| JP | 2013-017274 A | 1/2013 |
| JP | 2013-021886 A | 1/2013 |

* cited by examiner

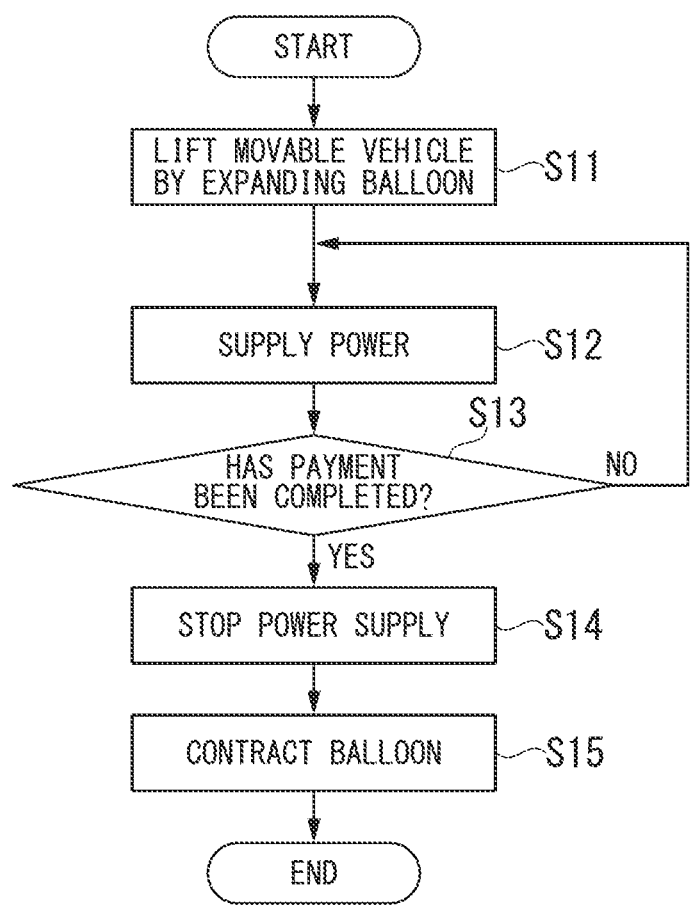

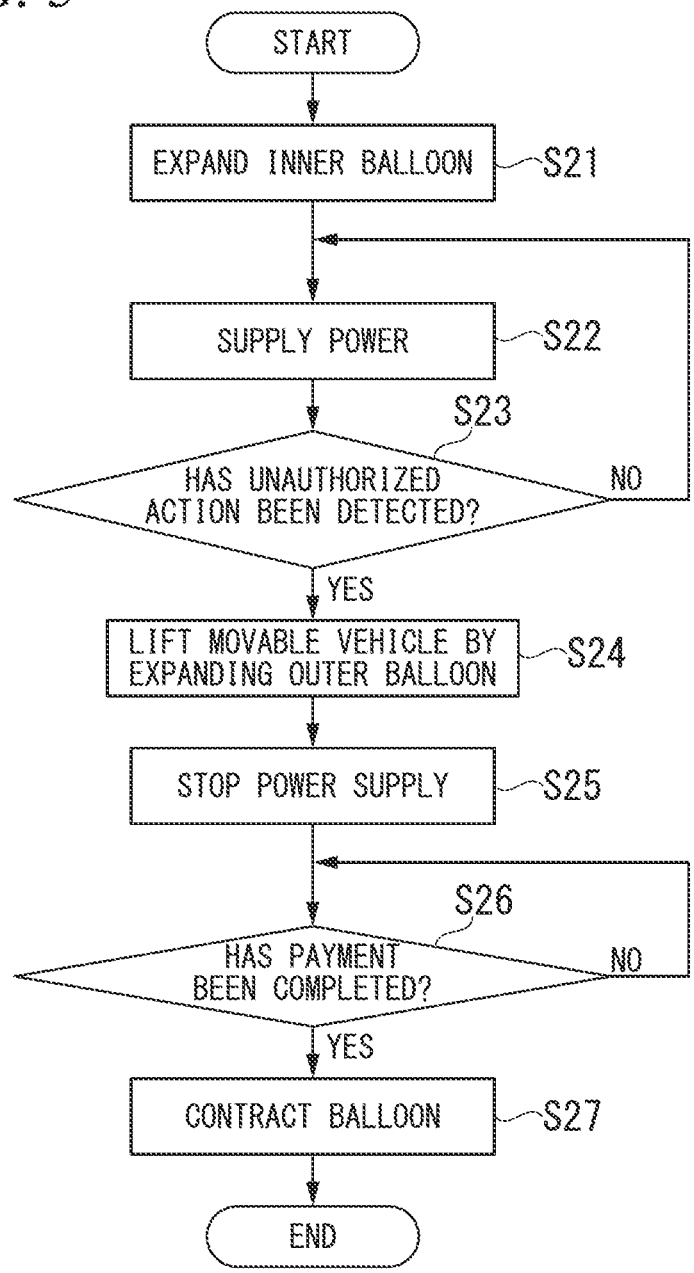

POWER SUPPLYING DEVICE, WIRELESS POWER-SUPPLYING SYSTEM, AND BAG UNIT

This application is a continuation application based on a PCT Patent Application No. PCT/JP2014/062598, filed on May 12, 2014, whose priority is claimed on Japanese Patent Application No. 2013-103288, filed on May 15, 2013. The contents of both the PCT application and the Japanese Patent Application are incorporated herein by reference.

TECHNICAL FIELD

The present disclosure relates to a wireless power-supplying system.

BACKGROUND ART

In recent years, wireless power-supplying systems capable of wirelessly supplying power from a power-supplying side to a power-receiving side have been actively developed. These wireless power-supplying systems are expected to be used for charging of a battery mounted on a vehicle such as an electric vehicle (EV) or a hybrid vehicle (HV) because they enable supply of power without the power-supplying side and the power-receiving side being connected by a wire (cable) and thus are very convenient.

The wireless power-supplying system used for charging the battery mounted on the vehicle, for example, is installed in each of parking spaces (parking regions) set within a parking area and wirelessly supplies power to the vehicle parked in the parking space. Here, efficient power supply may be implemented because vehicles are mostly parked to fit into the above-described parking space and the parking position is unlikely to be largely displaced.

In the following Patent Documents 1 and 2, examples of the conventional wireless power-supplying system are disclosed. Specifically, Patent Documents 1 and 2 disclose technology for avoiding a bad influence during power transmission due to a foreign object different from a power supply target by removing a foreign object in the vicinity of a power transmitting path between the power-supplying coil and the power-receiving coil or preventing a foreign object from intruding into the vicinity of the power transmitting path.

The following Patent Documents 3 and 4 disclose technology related to a fixing device and a billing system in the conventional mechanical-parking area.

DOCUMENT OF RELATED ART

Patent Document

[Patent Document 1]
  Japanese Unexamined Patent Application, First Publication No. 2013-21886
[Patent Document 2]
  Japanese Unexamined Patent Application, First Publication No. 2012-196015
[Patent Document 3]
  Japanese Unexamined Patent Application, First Publication No. Hei 11-107571
[Patent Document 4]
  Japanese Unexamined Patent Application, First Publication No. 2013-002085

SUMMARY

Technical Problem

In a paid parking area, an unauthorized use prevention system for preventing a vehicle from exiting until a usage fee is paid is installed to prevent unauthorized use. For example, an unauthorized use prevention system is installed which raises a plate-like flap between front and rear wheels of the vehicle when the vehicle is parked in the parking space and lowers the flap when the usage fee has been paid.

When the wireless power-supplying system is intended to be installed in this paid parking area, there is a problem in that cost significantly increases because the wireless power-supplying system should be installed in addition to the above-described unauthorized use prevention system. In addition, in the above-described conventional unauthorized use prevention system, when a malicious driver attempts to force the vehicle to cross the flap, the crossing may be possible. Conventionally, there is a problem in that the loss of a parking fee is caused by such unauthorized use. When the wireless power-supplying system is installed in the paid parking area, the loss is larger because the loss of a power fee in addition to the loss of the parking fee is caused.

The present disclosure is conceived in view of the above-described circumstances, and an object of the present disclosure is to provide a power-supplying device, a wireless power-supplying system, and a bag unit capable of preventing unauthorized use without significantly increasing cost.

Solution to Problem

According to the first aspect of the present disclosure, a power-supplying device includes: a power-supplying coil installed within a predefined parking region and configured to wirelessly supply power to a power-receiving coil of a vehicle parked in the parking region; a bag provided to cover the power-supplying coil and configured to expand to occupy a space between the power-supplying coil and the power-receiving coil, and fix the vehicle from below; and a control device configured to cause the bag to continuously fix the vehicle until payment of a usage fee of the parking region is completed when the vehicle is fixed from below by the bag.

In addition, according to the second aspect of the present disclosure, in the first aspect, the control device causes the bag to fix the vehicle and causes the supply of the power from the power-supplying coil to the power-receiving coil to be started when the vehicle has been parked in the parking region.

Alternatively, according to the third aspect of the present disclosure, in the first aspect, the bag includes a first bag provided to cover the power-supplying coil and configured to expand to occupy the space between the power-supplying coil and the power-receiving coil; and a second bag provided around the first bag and configured to expand to fix the vehicle from below.

According to the fourth aspect of the present disclosure, in the third aspect, the control device causes the first bag to occupy the space between the power-supplying coil and the power-receiving coil and causes the supply of the power from the power-supplying coil to the power-receiving coil to be started when the vehicle has been parked in the parking region.

According to the fifth aspect of the present disclosure, in the third aspect, the control device causes the second bag to fix the vehicle when unauthorized action for the vehicle parked in the parking region has been detected.

In addition, according to the sixth aspect of the present disclosure, in the first aspect, the power-supplying device includes: a gas supply and exhaust device configured to supply and exhaust a gas into and from the bag under control of the control device.

In addition, according to the seventh aspect of the present disclosure, in the sixth aspect, the gas supply and exhaust device supplies a non-magnetic powder or particles into the bag along with the gas when the gas is supplied into the bag.

In addition, according to the eighth aspect of the present disclosure, in the first aspect, the control device causes the bag to contract when payment of a usage fee of the parking region has been completed.

In addition, according to the ninth aspect of the present disclosure, a wireless power-supplying system including a power-supplying coil installed within a predefined parking region and configured to wirelessly supply power from the power-supplying coil to a power-receiving coil of a vehicle parked in the parking region includes: a bag provided to cover the power-supplying coil and configured to expand to occupy a space between the power-supplying coil and the power-receiving coil, and fix the vehicle from below; and a control device configured to cause the bag to continuously fix the vehicle until payment of a usage fee of the parking region is completed when the vehicle is fixed from below by the bag.

In addition, according to the tenth aspect of the present disclosure, a bag unit for a power-supplying coil installed within a predefined parking region and configured to wirelessly supply power to a power-receiving coil of a vehicle parked in the parking region includes: a bag provided to cover the power-supplying coil and configured to expand to occupy a space between the power-supplying coil and the power-receiving coil, and fix the vehicle from below; and a control device configured to cause the bag to continuously fix the vehicle until payment of a usage fee of the parking region is completed when the vehicle is fixed from below by the bag.

Effects of the Disclosure

According to the present disclosure, when a bag is provided to cover a power-supplying coil and a vehicle is fixed from below by the bag, the vehicle is continuously fixed by the bag until payment of a usage fee of a parking region is completed. Thereby, it is possible to prevent unauthorized use without significantly increasing cost because it is difficult to drive the vehicle before a usage fee is paid even when a conventionally necessary unauthorized use prevention system is not provided.

BRIEF DESCRIPTION OF THE DRAWINGS

FIG. 2 is a flowchart showing an example of an operation of the wireless power-supplying system according to the first embodiment of the present disclosure.

FIG. 5 is a flowchart showing an example of an operation of the wireless power-supplying system according to the second embodiment of the present disclosure.

DESCRIPTION OF EMBODIMENTS

Hereinafter, wireless power-supplying systems according to embodiments of the present disclosure will be described in detail with reference to the drawings.

First Embodiment

Figure 1:
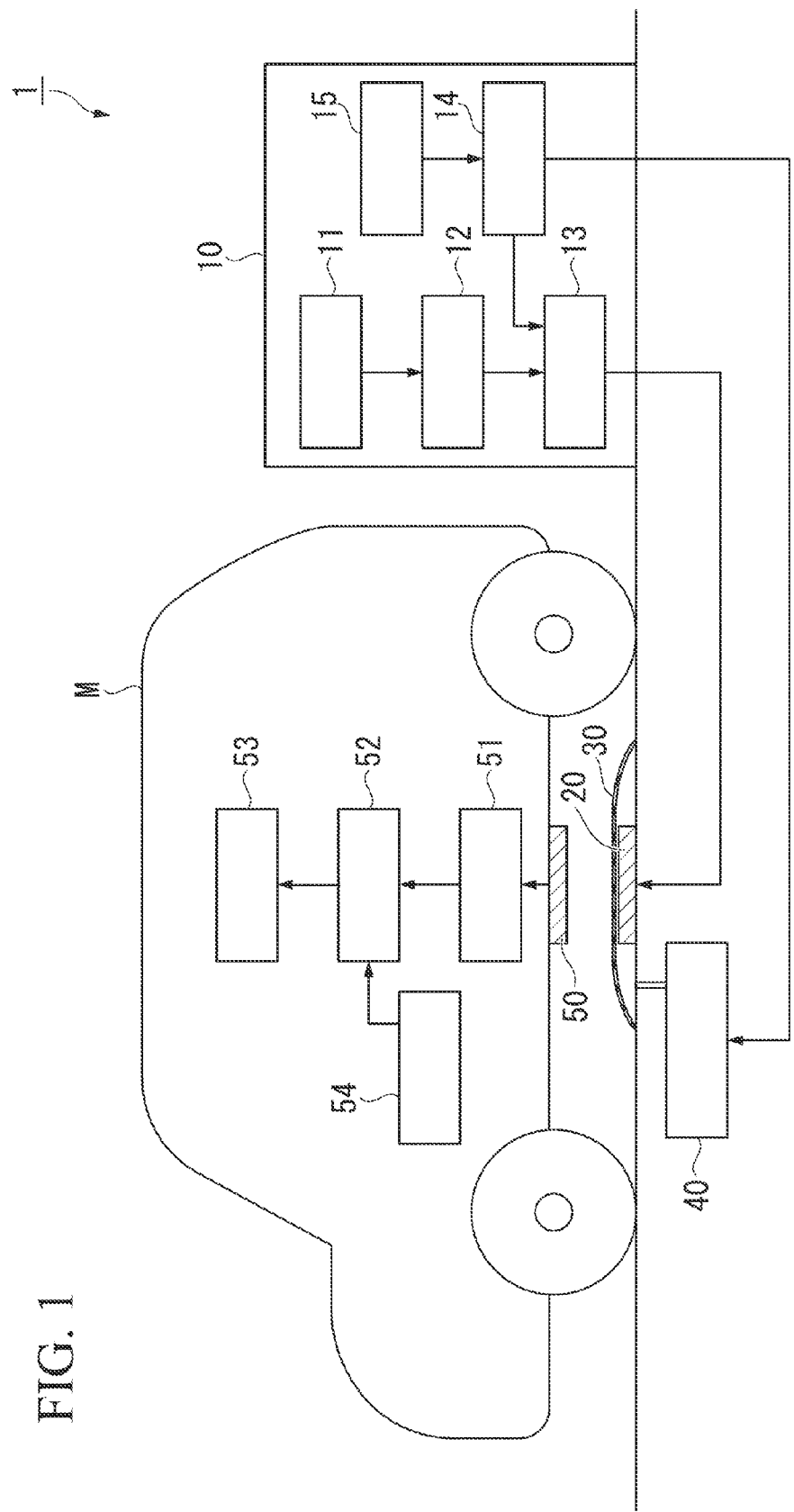
FIG. 1 is a block diagram showing a configuration of the main part of a wireless power-supplying system according to the first embodiment of the present disclosure.

FIG. 1 is a block diagram showing a configuration of the main part of a wireless power-supplying system according to the first embodiment of the present disclosure. As shown in FIG. 1, the wireless power-supplying system 1 includes a power-supplying device 10 and a gas supply and exhaust device 40 for power supply (gas supply and exhaust device), and wirelessly supplies power (electric power) to a vehicle M equipped with a battery 53. This wireless power-supplying system 1 is installed in a parking area, and wirelessly supplies power to the vehicle M parked in a parking space (parking region) segmented by a white line or the like.

The power-supplying device 10 includes a power source 11, a rectifier circuit 12, a power-supplying circuit 13, a power supply control unit 14 (control device), a payment device 15, a power-supplying coil 20, and a balloon 30 (bag), generates power suitable for wireless power supply to the vehicle M, performs various types of control (to be described in detail below) necessary in performing wireless power supply to the vehicle M, and performs payment of a usage fee. Although an example in which the power-supplying device 10 is installed on the ground will be described in this embodiment, the power-supplying device 10 may be installed underground or above the vehicle M (for example, a ceiling) as long as the driver can pay the parking fee (usage fee).

Output terminals of the power source 11 are connected to input terminals of the rectifier circuit 12, and the power source 11 supplies the rectifier circuit 12 with alternating current (AC) power necessary for power supply to the vehicle M. This power source 11, for example, is an electrical grid for supplying three-phase AC power of 200 V, 400 V, or the like or single-phase AC power of 100 V. The input terminals of the rectifier circuit 12 are connected to the power source 11 and output terminals thereof are connected to the power-supplying circuit 13. The rectifier circuit 12 rectifies the AC power supplied from the power source 11 to convert the AC power into direct current (DC) power, and outputs the DC power obtained through the conversion to the power-supplying circuit 13.

Input terminals of the power-supplying circuit 13 are connected to the rectifier circuit 12 and output terminals thereof are connected to both ends of the power-supplying coil 20. The power-supplying circuit 13 converts the DC power from the rectifier circuit 12 into AC power and outputs the AC power obtained through the conversion to the power-supplying coil 20. Specifically, the power-supplying circuit 13 includes a resonance capacitor constituting a power-supplying-side resonance circuit along with the power-supplying coil 20 and converts the DC power from the rectifier circuit 12 into AC power (high-frequency power) having a higher frequency than the AC power of the power source 11 to output the high-frequency power to the power-supplying coil 20 under control of the power supply control unit 14.

The power supply control unit 14 causes the power-supplying circuit 13 to generate power to be supplied to the vehicle M and causes the gas supply and exhaust device 40 for the power supply to expand or contract the balloon 30. Specifically, the power supply control unit 14 performs control of starting the supply of power to the vehicle M by causing the balloon 30 to lift the vehicle M when the vehicle M has been parked in the parking space. In addition, the power supply control unit 14 causes the balloon 30, which is expanded to lift the vehicle M, to contract when payment of the usage fee has been completed. This power supply control unit 14 includes a central processing unit (CPU), a memory, or the like, and performs various types of control described above based on a prepared power supply control program.

The payment device 15 calculates a usage fee according to a parking time of the vehicle M and performs payment of the usage fee when a payment instruction has been issued. Specifically, a cash insertion port (not shown) into which cash is inserted or a card insertion port (not shown) into which a parking card is inserted are provided, and the payment of the usage fee is performed with the cash inserted into the cash insertion port or the parking card inserted into the card insertion port. Further, when the payment of the usage fee has been completed, the payment device 15 outputs a signal indicating the payment completion to the power supply control unit 14.

The power-supplying coil 20 is a solenoid type coil having a predefined coil shape and wirelessly performs power supply to the vehicle M by generating a magnetic field according to high-frequency power supplied from the power-supplying circuit 13. Both ends of the power-supplying coil 20 are connected to the output terminals of the power-supplying circuit 13, and the power-supplying coil 20, for example, is installed on the ground so that a coil axis is in an up-down direction (vertical direction) in an exposed state or a state in which the power-supplying coil 20 is molded by a non-magnetic material such as plastic.

The balloon 30 is a type of balloon in which a stretchable, non-magnetic, and non-electrically-conductive elastic member such as rubber is formed in a film shape, and is provided to prevent intrusion of a foreign object into a space between the power-supplying coil 20 and the power-receiving coil 50 provided on the vehicle M, to fix the vehicle M from below, and to shield magnetic flux (leaked magnetic flux) radiated from a portion other than an end surface (upper surface) of the power-supplying coil 20. This balloon 30 is stretchable, but has sufficient strength to fix the vehicle M from below.

In addition, a powder of a high permeability material such as ferrite is attached outside an upper surface center (a portion in contact with the power-receiving coil 50 to be described below) of the balloon 30, and a powder including a magnetic flux shielding material such as aluminum powder or copper powder is mixed with or attached to the remaining portion. The upper surface center that the powder of the high permeability material is mixed with or attached to has both permeability to magnetic flux and stretchability, and the remaining portion that the powder including the magnetic flux shielding material is mixed with or attached to has both shielding performance against the magnetic flux and stretchability.

The balloon 30 is installed on the ground surface in a state in which the power-supplying coil 20 is covered (contained) and expands or contracts when the gas supply or exhaust is performed by the gas supply and exhaust device 40 for the power supply. When the balloon 30 expands, a space between the power-supplying coil 20 and the power-receiving coil 50 is occupied by the balloon 30. In this state, when the balloon 30 further expands, the vehicle M is fixed from below by the balloon 30. Further, the plan view shape of the balloon 30 is any given shape, for example, a circular shape or a rectangular shape.

The gas supply and exhaust device 40 for the power supply performs the supply and exhaust of the gas for the balloon 30 under control of the power supply control unit 14. The gas supply and exhaust device 40 for the power supply includes a gas supply and exhaust pipe communicating with the balloon 30 as shown in FIG. 1, and performs the supply and exhaust of the gas for the balloon 30 via the gas supply and exhaust pipe. Further, air is used as the gas to be supplied and exhausted to and from the balloon 30.

The vehicle M is a vehicle that is driven by a driver and runs on a road. For example, the vehicle M is an EV or an HV including a traction motor as a power generation source. As shown in FIG. 1, the vehicle M includes a power-receiving coil 50, a power-receiving circuit 51, a charging circuit 52, a battery 53, and a power reception control unit 54. Although not shown in FIG. 1, the vehicle M may include components necessary for running such as an engine, the aforementioned traction motor, an operating handle, and a brake.

The power-receiving coil 50 is a solenoid type coil having substantially the same coil dimensions as the above-described power-supplying coil 20 and is provided on the bottom of the vehicle M in a posture in which the coil axis is in an up-down direction (vertical direction) so that the power-receiving coil 50 can face the power-supplying coil 20. Both ends of the power-receiving coil 50 are connected to input terminals of the power-receiving circuit 51, and, when a magnetic field of the power-supplying coil 20 acts on the power-receiving coil 50, an electromotive force is generated through electromagnetic induction, and the power-receiving coil 50 outputs the generated electromotive force to the power-receiving circuit 51.

The input terminals of the power-receiving circuit 51 are connected to both ends of the power-receiving coil 50, and output terminals thereof are connected to input terminals of the charging circuit 52. The power-receiving circuit 51 converts AC power supplied from the power-receiving coil 50 into DC power to output the DC power obtained through the conversion to the charging circuit 52. This power-receiving circuit 51 includes a resonance capacitor constituting a power-receiving-side resonance circuit along with the power-receiving coil 50. Further, the electrostatic capacitance of the resonance capacitor of the power-receiving circuit 51 may be set so that a resonance frequency of the power-receiving-side resonance circuit is the same as a resonance frequency of the above-described power-supplying-side resonance circuit.

The input terminals of the charging circuit 52 are connected to output terminals of the power-receiving circuit 51 and output terminals thereof are connected to input terminals of the battery 53. The charging circuit 52 charges the battery 53 with power (DC power) from the power-receiving circuit 51. The battery 53 is a rechargeable battery (for example, a secondary battery such as a lithium ion battery or a nickel-metal hydride battery) mounted on the vehicle M, and supplies power to a traction motor (not shown) or the like. The power reception control unit 54 includes a CPU, a memory, and the like, and controls the charging circuit 52 based on a prepared power reception control program.

Figure 3A:
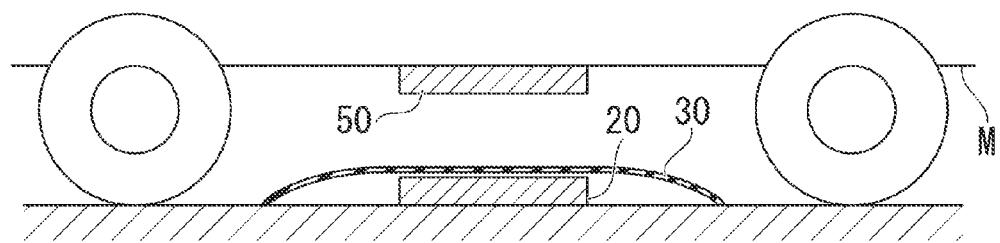
FIG. 3A is a side cross-sectional view showing the example of the operation of the wireless power-supplying system according to the first embodiment of the present disclosure.
Figure 3B:
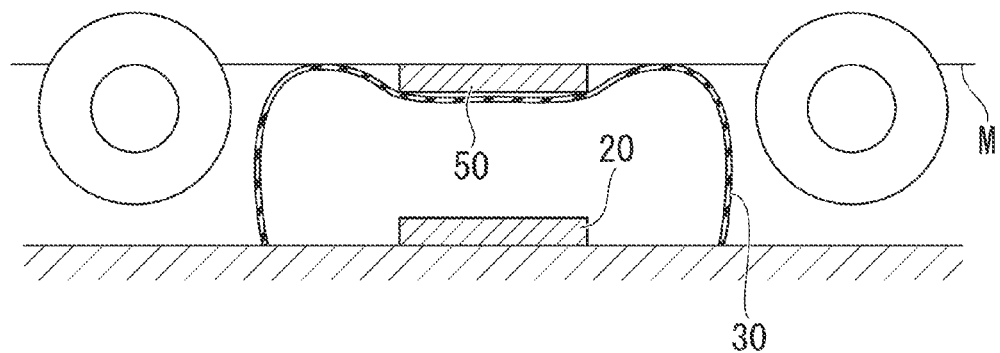
FIG. 3B is a side cross-sectional view showing the example of the operation of the wireless power-supplying system according to the first embodiment of the present disclosure.

Next, an operation of the wireless power-supplying system 1 in the above-described configuration will be described. FIG. 2 is a flowchart showing an example of an operation of the wireless power-supplying system according to the first embodiment of the present disclosure. FIGS. 3A and 3B are side cross-sectional views showing the same operation. Further, hereinafter, operations of the vehicle M and the power-supplying device 10 at a time when no power is supplied will be briefly described and then the operations at a time when power is wirelessly supplied from the power-supplying device 10 to the vehicle M will be described.

When no power is supplied (for example, when the vehicle M is driven normally by the driver), the power reception control unit 54 in the vehicle M causes the charging circuit 52 to stop. When no power is supplied (that is, when the vehicle M which is a power supply target is not parked in a parking space), the power-supplying device 10 stops the power-supplying circuit 13 and the power supply control unit 14 causes the gas supply and exhaust device 40 for the power supply to exhaust the gas so that the balloon 30 completely contracts.

Thereafter, when the driver drives the vehicle M to move to a parking space in which the power-supplying coil 20 is installed and stops the vehicle M in the place, an installation position of the power-supplying coil 20 is recognized by the power reception control unit 54. Further, as a method of recognizing the installation position of the power-supplying coil 20, for example, there is a method of recognizing the installation position based on an output of a position sensor such as a sound wave sensor or an optical sensor (not shown). When it is detected that the power-receiving coil 50 of the vehicle M is above the power-supplying coil 20 based on the recognized installation position of the power-supplying coil 20, control of causing the charging circuit 52 to charge the battery 53 is started by the power reception control unit 54.

In the power supply control unit 14 of the power-supplying device 10, the position of the vehicle M is recognized by the power supply control unit 14 based on an output of a position sensor such as a sound wave sensor or an optical sensor (not shown) as in the vehicle M. When it is detected that the power-receiving coil 50 of the vehicle M is above the power-supplying coil 20 based on the recognized position of the vehicle M, the power supply control unit 14 causes the balloon 30 to expand and lift the vehicle M (step S11).

When this control is performed, the balloon 30 transitions from a completely contracted state shown in FIG. 3A to an expanded state shown in FIG. 3B, a space between the power-supplying coil 20 and the power-receiving coil 50 is occupied by the expanded balloon 30, and the vehicle M is fixed from below by the expanded balloon 30. Here, as shown in FIG. 3B, the balloon 30 expands to cover the power-receiving coil 50 so that the balloon 30 abuts a lower surface and a side surface of the power-receiving coil 50 exposed from a base of the vehicle M. Thereby, the intrusion of a foreign object into the space between the power-supplying coil 20 and the power-receiving coil 50 is prevented. In addition, the vehicle M is fixed from below by the balloon 30, so that the tires of the vehicle M float in the air as shown in FIG. 3B, friction resistance between the tire and the ground surface is low, or it is difficult for the vehicle M to perform self-running.

When the above operation is finished, the power-supplying circuit 13 of the power-supplying device 10 is controlled by the power supply control unit 14, so that a power-supplying operation is started. Thereby, power is wirelessly supplied from the power-supplying coil 20 to the power-receiving coil 50 of the vehicle M (step S12). When the power is wirelessly supplied, the power reception control unit 54 causes the charging circuit 52 to charge the battery 53 while monitoring a charged state of the battery 53 in the vehicle M.

The power supply control unit 14 of the power-supplying device 10 determines whether payment has been completed based on a signal from the payment device 15 while the power supply is wirelessly performed (step S13). When it is determined that the payment has not been completed (when the determination result of step S13 is "NO"), the power supply control unit 14 causes the power-supplying circuit 13 to continue wireless power supply (step S12). When it is determined that the payment has been completed (when the determination result of step S13 is "YES"), the power supply control unit 14 causes the power-supplying circuit 13 to stop the power-supplying operation (step S14).

When the power-supplying operation stops, the gas supplied to the balloon 30 is exhausted by the gas supply and exhaust device 40 for the power supply, and control of contracting the balloon 30 is performed by the power supply control unit 14 (step S15). When the balloon 30 contracts, for example, the tires of the vehicle M contact the ground surface and the vehicle M can run as shown in FIG. 3A. Consequently, when the driver drives the vehicle M, the driver can drive the vehicle M outside the parking space.

Although the illustration is simplified for easier understanding in FIG. 2, the power reception control unit 54 naturally stops the charging circuit 52 when the power reception control unit 54 detects that the battery 53 is in the fully-charged state before the payment is completed (before the determination result of step S13 becomes "YES"). In this case, the process of step S12 is omitted and the determination process of step S13 is iterated. When the determination result of step S13 becomes "YES," the process of step S15 is performed. Further, when the battery 53 is in the fully-charged state, an indicator (not shown) or the like (for example, an indicator which indicates the charged state of the battery 53 and is provided in a driver seat) may notify that the battery 53 is in the fully-charged state.

As described above, in this embodiment, the supply of power to the vehicle M is performed by expanding the balloon 30 and lifting the vehicle M when the vehicle M has been parked in the parking space, and, for example, a state in which the vehicle M is lifted is maintained until the payment of a usage fee is completed. Thereby, it is possible to prevent unauthorized use without significantly increasing cost because it is difficult to drive the vehicle before a usage fee is paid without providing an unauthorized use prevention system conventionally needed. In addition, it is possible to cut off the leakage of leaked magnetic flux radiated from the power-supplying coil 20 (the leakage outside the balloon 30).

Second Embodiment

Figure 4:
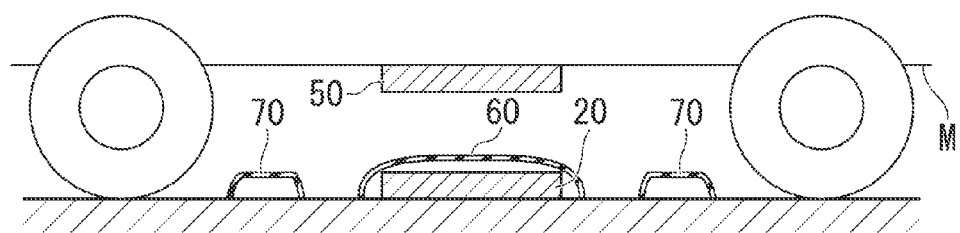
FIG. 4 is a side cross-sectional view showing the main part configuration of a wireless power-supplying system according to the second embodiment of the present disclosure.

FIG. 4 is a side cross-sectional view showing a main part configuration of a wireless power-supplying system according to the second embodiment of the present disclosure. Further, the entire configuration of the wireless power-supplying system of this embodiment is substantially similar to the wireless power-supplying system shown in FIG. 1. As shown in FIG. 4, the wireless power-supplying system of this embodiment is configured to include an inner balloon 60 (first bag) and an outer balloon 70 (second bag) instead of the balloon 30 of FIG. 1.

The inner balloon 60 is a type of balloon in which a stretchable elastic member such as rubber is formed in a film shape and is provided to prevent intrusion of a foreign object into a space between the power-supplying coil 20 and the power-receiving coil 50 provided on the vehicle M and shield magnetic flux (leaked magnetic flux) radiated from a portion other than an end surface (upper surface) of the power-supplying coil 20. The inner balloon 60 is installed on the ground surface in a state in which the power-supplying coil 20 is covered (contained) and expands or contracts when the gas supply or exhaust is performed by the gas supply and exhaust device 40 for the power supply. When the inner balloon 60 expands, the space between the power-supplying coil 20 and the power-receiving coil 50 is occupied by the inner balloon 60.

As in the balloon 30 shown in FIG. 1, a powder of high permeability material such as ferrite is attached to an upper surface center (a portion in contact with the power-receiving coil 50) of the inner balloon 60, and a powder including a magnetic flux shielding material such as aluminum powder or copper powder is mixed with or attached to the remaining portion. That is, the upper surface center that the powder of the high permeability material is mixed with or attached to has both permeability to magnetic flux and stretchability, and the remaining portion that the powder including the magnetic flux shielding material is mixed with or attached to has both shielding performance against magnetic flux and stretchability. Further, the plan view shape of the inner balloon 60 is any given shape, for example, a circular shape or a rectangular shape.

The outer balloon 70 is a type of balloon in which a stretchable elastic member such as rubber is formed in a film shape and is provided around the inner balloon 60 so as to expand to lift the vehicle M. Thus, similar to the balloon 30 shown in FIG. 1, the outer balloon 70 is stretchable, but has sufficient strength to lift the vehicle M upward. Further, the plan view shape of the outer balloon 70 is any given shape, for example, an annular shape and is disposed to surround the inner balloon 60.

Figure 6A:
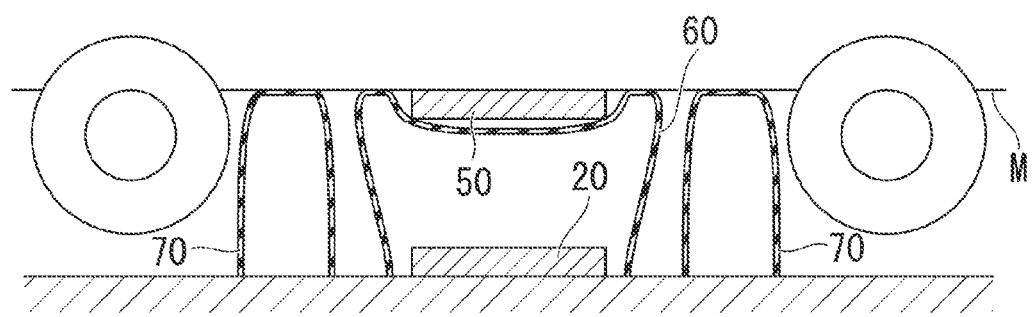
FIG. 6A is a side cross-sectional view showing the example of the operation of the wireless power-supplying system according to the second embodiment of the present disclosure.
Figure 6B:
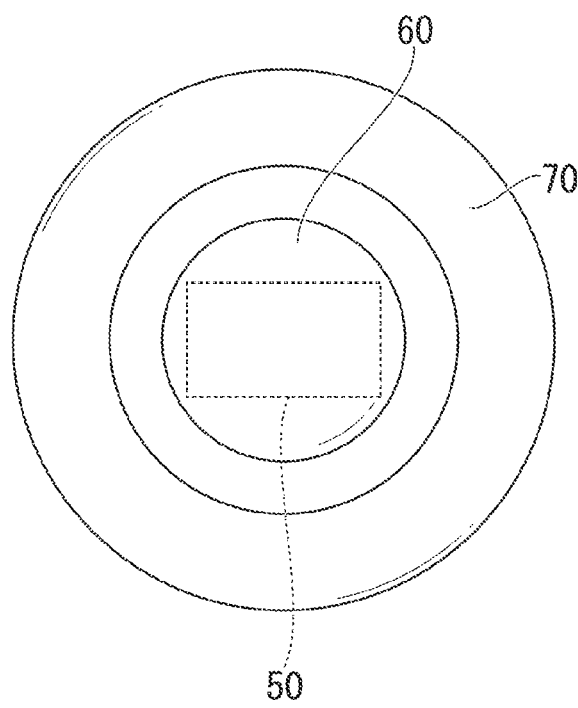
FIG. 6B is a side cross-sectional view showing the example of the operation of the wireless power-supplying system according to the second embodiment of the present disclosure.

Next, an operation of the wireless power-supplying system according to this embodiment will be described. FIG. 5 is a flowchart showing an example of an operation of the wireless power-supplying system according to the second embodiment of the present disclosure. FIGS. 6A and 6B are side cross-sectional views showing the example of the same operation. In this embodiment, as in the first embodiment, when the driver drives the vehicle M to move and park the vehicle M in the parking space, the position of the power-supplying coil 20 is recognized and control of charging the battery 53 provided in the vehicle M is started.

Here, when it is detected that the power-receiving coil 50 of the vehicle M is above the power-supplying coil 20 by recognizing the position of the vehicle M in this embodiment, the power supply control unit 14 causes the inner balloon 60 to expand (step S21). That is, the outer balloon 70 remains contracted and only the inner balloon 60 is caused to expand. When this control is performed, the space between the power-supplying coil 20 and the power-receiving coil 50 is occupied by the expanded inner balloon 60, so that the intrusion of a foreign object into the space between the power-supplying coil 20 and the power-receiving coil 50 is prevented.

When the above operation is finished, the power-supplying circuit 13 of the power-supplying device 10 is controlled by the power supply control unit 14, so that a power-supplying operation is started. Thereby, power is wirelessly supplied from the power-supplying coil 20 to the power-receiving coil 50 of the vehicle M (step S22). When the power is wirelessly supplied, the power reception control unit 54 causes the charging circuit 52 to charge the battery 53 while monitoring a charged state of the battery 53 in the vehicle M.

The power supply control unit 14 of the power-supplying device 10 determines whether unauthorized action has been detected while the power is wirelessly supplied (step S23). Here, the "unauthorized action" is the action of evading the payment of the usage fee of the parking space, for example, the action of driving the vehicle M without paying the usage fee. When it is determined that the unauthorized action has not been detected (when the determination result of step S23 is "NO"), the power supply control unit 14 continues to wirelessly supply power by controlling the power-supplying circuit 13 (step S22).

When it is determined that the unauthorized action has been detected (when the determination result of step S23 is "YES"), the power supply control unit 14 causes the outer balloon 70 to expand and lift the vehicle M (step S24). The vehicle M is lifted by the outer balloon 70, such that the tires of the vehicle M float in the air and it is difficult to drive the vehicle M as shown in FIG. 6A.

Here, the vehicle M is stably supported by the outer balloon 70 expanding to surround the periphery of the inner balloon 60 as shown in FIG. 6B. Thus, for example, a malicious driver cannot bring the tires in contact with the ground surface even if the driver attempts to bring the tires (drive wheels) in contact with the ground surface by shaking the vehicle M supported by the outer balloon 70 so as to drive the vehicle M.

When the vehicle M is lifted by the outer balloon 70, the power supply control unit 14 causes the power-supplying circuit 13 to stop a power-supplying operation (step S25). Then, the power supply control unit 14 determines whether payment has been completed based on a signal from the payment device 15 (step S26). When it is determined that the payment has not been completed (when the determination result of step S26 is "NO"), the power supply control unit 14 iterates the determination of step S26.

When it is determined that the payment has been completed (when the determination result of step S26 is "YES"), the power supply control unit 14 causes the inner balloon 60 and the outer balloon 70 to contract (step S27). When the inner balloon 60 and the outer balloon 70 contract, the tires of the vehicle M come in contact with the ground surface as shown in FIG. 4 and the vehicle M can run. Consequently, when the driver drives the vehicle M, the driver can drive the vehicle M outside the parking space.

Further, the power reception control unit 54 naturally stops the charging circuit 52 when the power reception control unit 54 detects that the battery 53 is in the fully-charged state before the unauthorized action is detected (before the determination result of step S23 of FIG. 5 becomes "YES") in this embodiment. In addition, when no unauthorized action has been detected and the payment has been performed, the inner balloon 60 is caused to contract without expanding the outer balloon 70.

As described above, in this embodiment, power is supplied to the vehicle M by expanding the inner balloon 60 when the vehicle M has been parked in the parking space, the vehicle M is lifted by expanding the outer balloon 70 when the unauthorized action has been detected, and the vehicle M remains lifted by the outer balloon 70 until the payment of the usage fee is completed.

Thereby, it is possible to prevent unauthorized use without significantly increasing cost because it is difficult to drive the vehicle before a usage fee is paid without providing an unauthorized use prevention system conventionally needed. In addition, it is possible to cut off the leakage of leaked magnetic flux radiated from the power-supplying coil 20 (the leakage outside the inner balloon 60).

Although the wireless power-supplying system according to the embodiment of the present disclosure has been described above, the present disclosure is not limited to the above-described embodiment and can be freely modified within the scope of the present disclosure. For example, although it is determined whether payment has been performed after the vehicle M has been lifted by the outer balloon 70 in the above-described second embodiment, the fact that the unauthorized action has been detected may be notified to a management company without performing the determination.

In addition, in the above-described embodiment, the jamming transition phenomenon may be used. That is, the inside of the balloon 30 or the inner balloon 60 is filled with a powder or particles by supplying a non-magnetic powder or particles along with the gas within the balloon 30 or the inner balloon 60 and the power-receiving coil 50 are in a covered state by expanding the balloon 30 or the inner balloon 60. Thereafter, the powder or particles within the balloon 30 or the inner balloon 60 are solidified in a pseudo manner by exhausting only the gas within the balloon 30 or the inner balloon 60. In this state, because the powder or particles are solidified in a state in which the power-supplying coil 20 and the power-receiving coil 50 are covered, the space between the power-supplying coil 20 and the power-receiving coil 50 can be occupied. In addition, in the first embodiment, the vehicle M can be fixed from below by the powder or particles solidified within the balloon 30.

In addition, in the above-described second embodiment, a jamming transition phenomenon may also be used for the outer balloon 70. That is, when the unauthorized action is detected and the outer balloon 70 is expanded, the inside of the outer balloon 70 is filled with a powder or particles by supplying a non-magnetic powder or particles inside the outer balloon 70 along with the gas within the outer balloon 70 and the vehicle M is lifted by the outer balloon 70. Thereafter, the powder or particles within the outer balloon 70 are solidified in a pseudo manner by exhausting only the gas within the outer balloon 70. Thereby, the vehicle M can be fixed from below by the powder or particles solidified within the outer balloon 70.

In this manner, in the first and second embodiments, the vehicle M can be fixed from below by a powder or particles solidified within the balloon 30 or the outer balloon 70 using a jamming transition phenomenon. Thereby, it is difficult to drive the vehicle M, for example, before the usage fee is paid.

Further, although a magnetic field resonance scheme has been adopted as a wireless power-supplying method in the above-described embodiment, an electromagnetic induction scheme may be adopted.

Further, in the above-described embodiment, the power supply control unit 14 may be provided independently of the power-supplying device 10. A bag unit may be configured by the balloon 30 and the power supply control unit 14.

INDUSTRIAL APPLICABILITY

According to the present disclosure, it is possible to prevent unauthorized use without significantly increasing cost.

The invention claimed is:

1. A power-supplying device comprising:
a power-supplying coil installed within a predefined parking region and configured to wirelessly supply power to a power-receiving coil of a vehicle parked in the parking region;
a bag provided to cover the power-supplying coil and configured to expand to occupy a space between the power-supplying coil and the power-receiving coil and fix the vehicle from below; and
a control device configured to cause the bag to continuously fix the vehicle until payment of a usage fee of the parking region is completed when the vehicle is fixed from below by the bag,
wherein the bag includes a first bag provided to cover the power-supplying coil and configured to expand to occupy the space between the power-supplying coil and the power-receiving coil; and
a second bag provided around the first bag and configured to expand to fix the vehicle from below.

2. The power-supplying device according to claim 1, wherein the control device causes the bag to fix the vehicle and causes the supply of the power from the power-supplying coil to the power-receiving coil to be started when the vehicle has been parked in the parking region.

3. The power-supplying device according to claim 1, wherein the control device causes the first bag to occupy the space between the power-supplying coil and the power-receiving coil and causes the supply of the power from the power-supplying coil to the power-receiving coil to be started when the vehicle has been parked in the parking region.

4. The power-supplying device according to claim 1, wherein the control device causes the second bag to fix the vehicle when unauthorized action for the vehicle parked in the parking region has been detected.

5. The power-supplying device according to claim 1, comprising:
a gas supply and exhaust device configured to supply and exhaust a gas into and from the bag under control of the control device.

6. The power-supplying device according to claim 5, wherein the gas supply and exhaust device supplies a non-magnetic powder or particles into the bag along with the gas when the gas is supplied into the bag.

7. The power-supplying device according to claim 1, wherein the control device causes the bag to contract when payment of a usage fee of the parking region has been completed.

8. A wireless power-supplying system including a power-supplying coil installed within a predefined parking region and configured to wirelessly supply power from the power-supplying coil to a power-receiving coil of a vehicle parked in the parking region, the wireless power-supplying system comprising:
- a bag provided to cover the power-supplying coil and configured to expand to occupy a space between the power-supplying coil and the power-receiving coil and fix the vehicle from below; and
- a control device configured to causes the bag to continuously fix the vehicle until payment of a usage fee of the parking region is completed when the vehicle is fixed from below by the bag,
- wherein the bag includes a first bag provided to cover the power-supplying coil and configured to expand to occupy the space between the power-supplying coil and the power-receiving coil; and
- a second bag provided around the first bag and configured to expand to fix the vehicle from below.

9. A bag unit for a power-supplying coil installed within a predefined parking region and configured to wirelessly supply power to a power-receiving coil of a vehicle parked in the parking region, the bag unit comprising:
- a bag provided to cover the power-supplying coil and configured to expand to occupy a space between the power-supplying coil and the power-receiving coil and fix the vehicle from below; and
- a control device configured to causes the bag to continuously fix the vehicle until payment of a usage fee of the parking region is completed when the vehicle is fixed from below by the bag,
- wherein the bag includes a first bag provided to cover the power-supplying coil and configured to expand to occupy the space between the power-supplying coil and the power-receiving coil; and
- a second bag provided around the first bag and configured to expand to fix the vehicle from below.

* * * * *